United States Patent
Sudan et al.

(10) Patent No.: US 10,862,374 B2
(45) Date of Patent: Dec. 8, 2020

(54) ROTOR FOR A SYNCHRONOUS MACHINE

(71) Applicant: Bayerische Motoren Werke Aktiengesellschaft, Munich (DE)

(72) Inventors: Christoph Sudan, Eurasburg (DE); Berthold Schinnerl, Thalhausen/Kranzburg (DE); Nuno Miguel da Silva Cerqueira, Pastetten Zeilern (DE); Falko Friese, Bensheim (DE); Daniel Ruppert, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1056 days.

(21) Appl. No.: 15/356,184

(22) Filed: Nov. 18, 2016

(65) Prior Publication Data

US 2017/0070126 A1     Mar. 9, 2017

Related U.S. Application Data

(63) Continuation of application No. PCT/EP2015/059465, filed on Apr. 30, 2015.

(30) Foreign Application Priority Data

May 21, 2014   (DE) .................. 10 2014 209 607

(51) Int. Cl.
*H02K 11/30*     (2016.01)
*H02P 9/10*      (2006.01)
(Continued)

(52) U.S. Cl.
CPC .............. *H02K 11/30* (2016.01); *B60L 50/51* (2019.02); *H02K 11/0094* (2013.01); *H02P 9/10* (2013.01); *H02P 9/302* (2013.01); *H02P 25/03* (2016.02)

(58) Field of Classification Search
CPC ....... H02P 21/18; H02P 21/24; H02K 11/048; H02K 16/02; H02K 21/029
See application file for complete search history.

(56) References Cited

U.S. PATENT DOCUMENTS 6,680,836 B1   1/2004  Zizler
6,900,714 B1 * 5/2005  Huang ................... H02H 7/001
                                                310/52

(Continued)

FOREIGN PATENT DOCUMENTS

CH       413 985 A    5/1966
CN       1365503 A    8/2002
(Continued)

OTHER PUBLICATIONS

Chinese Office Action issued in Chinese counterpart application No. 201580011247.6 dated Mar. 12, 2018, with English translation (Eighteen (18) pages).

(Continued)

*Primary Examiner* — Zoheb S Imtiaz
(74) *Attorney, Agent, or Firm* — Crowell & Moring LLP

(57) ABSTRACT

A rotor for a synchronous machine of a motor vehicle includes an excitation coil configured to generate a magnetic field necessary for rotation of the rotor in a stator of the synchronous machine. The rotor also includes a supply circuit, to which energy is fed contactlessly such that the supply circuit supplies the excitation coil with the energy. The rotor also includes a demagnetization circuit configured to demagnetize the excitation coil, which, upon collapse of the energy supply of the excitation coil, diverts a current flowing through the excitation coil into a circuit branch in which at least one component for demagnetization is arranged, wherein the at least one component is also configured to perform a protection function to protect the supply (Continued)

circuit against an induced voltage generated at the excitation coil.

12 Claims, 4 Drawing Sheets

(51) Int. Cl.
*H02P 9/30* (2006.01)
*H02P 25/03* (2016.01)
*B60L 50/51* (2019.01)
*H02K 11/00* (2016.01)

(56) References Cited

U.S. PATENT DOCUMENTS

| | | |
|---|---|---|
| 2002/0053889 A1 | 5/2002 | Gold |
| 2005/0286180 A1* | 12/2005 | Huang .................. H02H 7/001 361/23 |
| 2006/0181251 A1 | 8/2006 | Velhner et al. |
| 2006/0192534 A1* | 8/2006 | Yamauchi ............... H02P 9/102 322/25 |
| 2014/0176087 A1* | 6/2014 | Mouni ................. H02K 19/365 322/59 |
| 2016/0065090 A1* | 3/2016 | Dent ...................... H02K 47/26 363/102 |

FOREIGN PATENT DOCUMENTS

| | | |
|---|---|---|
| CN | 102832775 A | 12/2012 |
| CN | 103609015 A | 2/2014 |
| WO | WO 2012/172486 A2 | 12/2012 |
| WO | WO 2013/087528 A1 | 6/2013 |

OTHER PUBLICATIONS

PCT/EP2015/059465, International Search Report (PCT/ISA/220 and PCT/ISA/210) dated Nov. 25, 2015, with partial English translation, enclosing Written Opinion of the International Searching Authority (PCT/ISA/237) (Thirteen (13) pages).

* cited by examiner

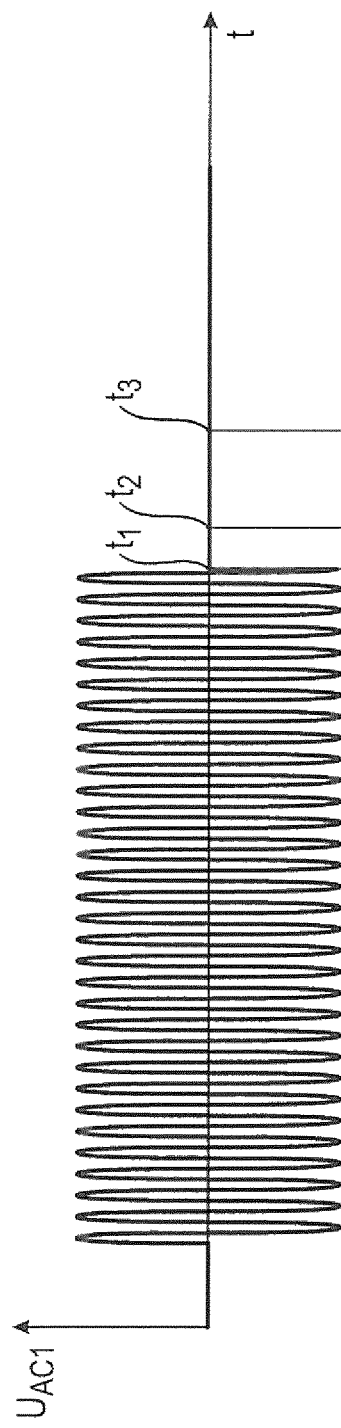
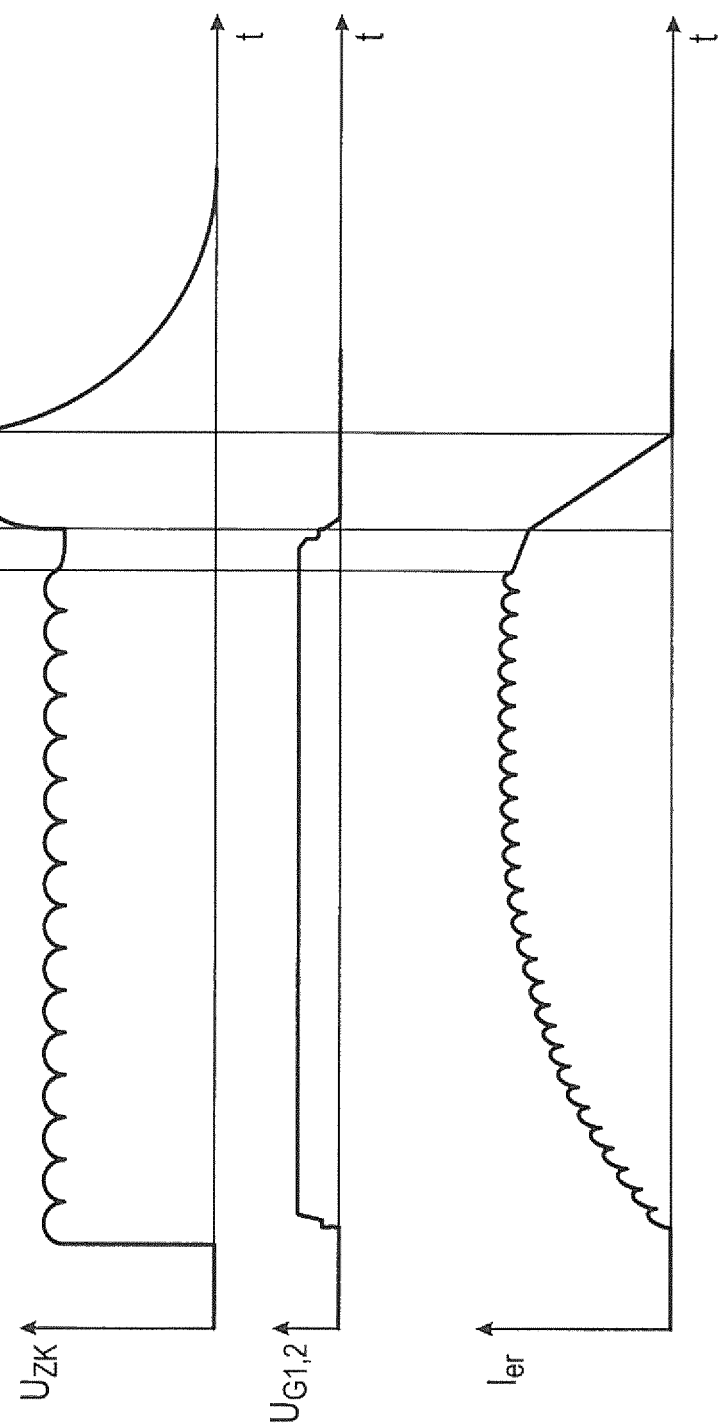
Fig. 3A Fig. 3B Fig. 3C Fig. 3D

ROTOR FOR A SYNCHRONOUS MACHINE

CROSS REFERENCE TO RELATED APPLICATIONS

This application is a continuation of PCT International Application No. PCT/EP2015/059465, filed Apr. 30, 2015, which claims priority under 35 U.S.C. § 119 from German Patent Application No. 10 2014 209 607.3, filed May 21, 2014, the entire disclosures of which are herein expressly incorporated by reference.

BACKGROUND AND SUMMARY OF THE INVENTION

The invention relates to a rotor for a synchronous machine, in particular for a synchronous machine which drives a motor vehicle or forms a part of a range extender, and to a corresponding synchronous machine.

For reasons of protecting the environment and on account of ever diminishing resources of fossil fuels, in the motor vehicle industry the trend is toward driving vehicles at least additionally or else completely by means of an electric machine.

Such electric machines may be separately excited synchronous machines which bear an excitation coil on their rotor for generating a necessary magnetic field. The excitation coil arranged on the rotor can be excited in a brushless manner by energy being transmitted to the rotor via an inductive rotary transformer (rotating transformer) and the excitation coil being supplied with the transmitted energy for generating the magnetic field. In this case, on the rotor an AC voltage generated at a coil is converted or rectified by a rectifier into a DC voltage present at the excitation coil.

Upon shutdown of the rotary transformer, for example upon an emergency shutdown, a fast de-excitation or demagnetization of the excitation coil is desirable in order to attain a safe state. In this context, the document WO2012/123847A2 discloses a separately excited synchronous machine comprising a demagnetization circuit arranged on the corresponding rotor. Although the demagnetization circuit provides for a fast demagnetization of the excitation coil after shutdown of the rotary transformer, it is complex in terms of circuitry.

The inventors have recognized that protection of the rectifier against induced voltages which are generated at the excitation coil and which occur as a result of undesired electromagnetic interactions between stator and rotor is also worthwhile besides the fast demagnetization.

However, additional circuits firstly would increase the circuitry complexity and secondly could only be realized with difficulty on account of the limited availability of space on the rotor. Furthermore, with additional circuits, the costs of the rotor would also increase to a corresponding increasing extent.

Against this background it is an object of the invention to provide a rotor and a synchronous machine which enable reliable and robust operation of a synchronous machine with low circuitry complexity.

It is at least an aim of the present invention to provide an alternative rotor and an alternative synchronous machine to the prior art.

According to one embodiment of the invention, the rotor comprises an excitation coil for generating a magnetic field necessary for rotation of the rotor in a stator of the synchronous machine, and a supply circuit, to which energy can be fed contactlessly in such a way that the supply circuit supplies the excitation coil for generating the magnetic field with the energy.

The supply circuit comprises, for example, a secondary side of an inductive rotary transformer and a rectifier that converts an AC voltage generated by the secondary side of the rotary transformer into a DC voltage present at the excitation coil. A primary side of the rotary transformer is arranged at the stator into which the rotor according to the invention is inserted, wherein the energy necessary for exciting the excitation coil or for generating the magnetic field is transmitted inductively to the rotor or is fed to the supply circuit containing the secondary side.

A demagnetization circuit is provided for demagnetizing the excitation coil, wherein the demagnetization circuit, upon collapse of the energy supply of the excitation coil by the supply circuit, diverts a current generated by the excitation coil or flowing through the excitation coil into a circuit branch in which at least one component provided for demagnetizing the excitation coil is arranged, said at least one component also performing a protection function for protecting the supply circuit against an induced voltage generated at the excitation coil.

Since the component in the circuit branch contributes both to the function of demagnetization and the function of protecting the supply circuit against excessively high induced voltages, the circuitry complexity can be kept low.

Preferably, the at least one component performs the protection function for protecting the supply circuit against the induced voltage during the energy supply of the excitation coil performed by the supply circuit and also upon/after collapse of the energy supply of the excitation coil performed by the supply circuit.

With further preference, the at least one component is a component which reduces its resistance starting from a value of the induced voltage, wherein the demagnetization circuit is designed, upon collapse of the energy supply of the excitation coil performed by the supply circuit, to invert the voltage generated by the excitation coil or the voltage jumping at the excitation coil and to apply it to the circuit branch in such a way that the current flowing through/generated by the excitation coil flows through the component.

As a result of the inversion of the voltage generated upon collapse of the energy supply at the excitation coil, said voltage is present with the same polarity as the undesired induced voltage at the component and leads to the reduction of the resistance of the component. In this respect, a very simple passive unidirectional component such as a suppressor diode, a Zener diode or else a varistor can serve both for faster demagnetization and for protecting the supply circuit or the rectifier.

By way of example, the demagnetization circuit comprises a bridge-like circuit constructed from two series circuits and the excitation coil in the bridge branch, wherein the two series circuits are formed in each case from a switch connected in series with a diode.

The demagnetization circuit is preferably designed in such a way that upon collapse of the energy supply of the excitation coil, the switches are switched and the diodes invert the voltage generated by the excitation coil.

The switching of said switches leads in particular to the diversion of the current generated by/flowing through the excitation coil into the circuit branch in which the at least one component is arranged.

The switches may be formed from transistors, for example from field effect transistors, bipolar transistors or IGB transistors (insulated gate bipolar transistors). Preferably, said transistors have antiparallel diodes (intrinsic or provided separately) that are connected in parallel with the corresponding source-drain channels or emitter-collector junctions.

The switching of the switches is carried out by driving the corresponding base terminals in the case of bipolar transistors and by driving the corresponding gate terminals in the case of field effect transistors or IGB transistors.

The demagnetization circuit is preferably designed in such a way that the switches are closed during the energy supply of the excitation coil by the supply circuit and are opened upon collapse of the energy supply.

As a result of the opening of the corresponding switches, the excitation current flowing through the excitation coil can only flow through the diodes, as a result of which the voltage generated at the excitation coil is inverted and is present at the component.

Preferably, the demagnetization circuit comprises at least one driver circuit that drives the switches. The driver circuit comprises a driver supply circuit, to which energy can be fed—for example also contactlessly—in such a way that the driver supply circuit supplies a comparator with energy. Depending on whether the driver supply circuit supplies the comparator with energy or the energy supply by the driver supply circuit has collapsed, the comparator outputs an output signal for driving the switches. In this respect, the energy supply of the comparator also forms the input signal of the comparator.

The driver circuit is constructed for example from an auxiliary coil of the secondary side of the rotary transformer and a rectifier assigned to the auxiliary coil, or else by means of an octocoupler. The collapse of the energy supply of the comparator by the driver supply circuit leads to an output signal of the comparator such that the switches of the demagnetization circuit are correspondingly switched.

Preferably, the driver circuit is designed in such a way that the driver supply circuit charges a storage unit which, upon collapse of the energy supply of the comparator performed by the driver supply circuit, maintains the energy supply of the comparator until the comparator has output the output signal for driving or switching the switches.

Preferably, the comparator is formed from a Schmitt trigger, and both the storage unit and an input threshold of the Schmitt trigger, across which the voltage supplied by the driver supply circuit is dropped, in each case comprise a capacitor, wherein the driver circuit is dimensioned in such a way that a time constant for discharging the capacitor of the input threshold is less than a time constant for discharging the capacitor of the storage unit.

As a result, the comparator operates at least until the capacitor of the input threshold is discharged and switching of the switches occurs.

Extremely sharp, fast and clean switching of the switches is ensured by this configuration of the driver.

By way of example, the at least one component is at least one unidirectional suppressor diode and/or at least one unidirectional varistor and/or at least one unidirectional Zener diode.

Preferably, the at least one component is formed from an array of Zener diodes and/or suppressor diodes and/or varistors.

Preferably, a multiplicity of series circuits comprising a plurality of components are arranged in the circuit branch, wherein the series circuits are connected in parallel with one another.

As a result, the power to be taken up is distributed better among a plurality of components present in the array or the series circuit.

However, the at least one component arranged in the circuit branch may be a bidirectional component which reduces its resistance upon collapse of the energy supply performed by the supply circuit starting from a value of a voltage generated by the excitation coil and starting from a value of an induced voltage generated at the excitation coil with opposite polarity.

If, on the one hand, for example, upon an emergency shutdown of the synchronous machine the energy supply of the excitation coil collapses, the voltage generated by the excitation coil jumps to a value corresponding to the value at which the bidirectional component reduces its resistance. This leads to a large current change of the current flowing through the excitation coil and thus to a fast de-excitation or demagnetization of the excitation coil.

If, on the other hand, for example, an induced voltage of opposite polarity that has the value occurs at the excitation coil, which is caused by an electromagnetic interaction between stator and rotor, the resistance of the bidirectional component correspondingly decreases and takes up the current flowing through/generated by the excitation coil. The supply circuit or the rectifier is thus protected.

By way of example, the at least one component is at least one bidirectional suppressor diode and/or at least one bidirectional varistor and/or at least one bidirectional Zener diode.

Preferably, in the circuit branch a multiplicity of series circuits comprising a plurality of bidirectional components are arranged, wherein the series circuits are connected in parallel with one another.

The demagnetization circuit comprises, for example, a switch in the form of a transistor which is kept in its closed (conducting) state during the energy supply of the excitation coil and is switched into its open (non-conducting) state upon collapse of the energy supply, which leads to a diversion of the current generated by the excitation coil or flowing through the excitation coil. The drive signal of the transistor is supplied for example by an auxiliary coil of the rotary transformer, a rotary transformer assigned separately to the transistor, or else an optocoupler.

The invention likewise relates to a synchronous machine for a motor vehicle which comprises a rotor explained above.

Preferred embodiments of the invention will now be explained with reference to the accompanying figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A schematically shows a signal profile of an AC voltage generated at a secondary side of an inductive rotary transformer;

FIG. 3B shows a signal profile of a voltage output by a rectifier;

FIG. 3C shows the signal profile of an output voltage of the driver circuits shown in FIG. 1; and FIG. 3D shows a signal profile of the current flowing through the excitation coil;

DETAILED DESCRIPTION OF THE DRAWINGS

First Embodiment

Figure 1:
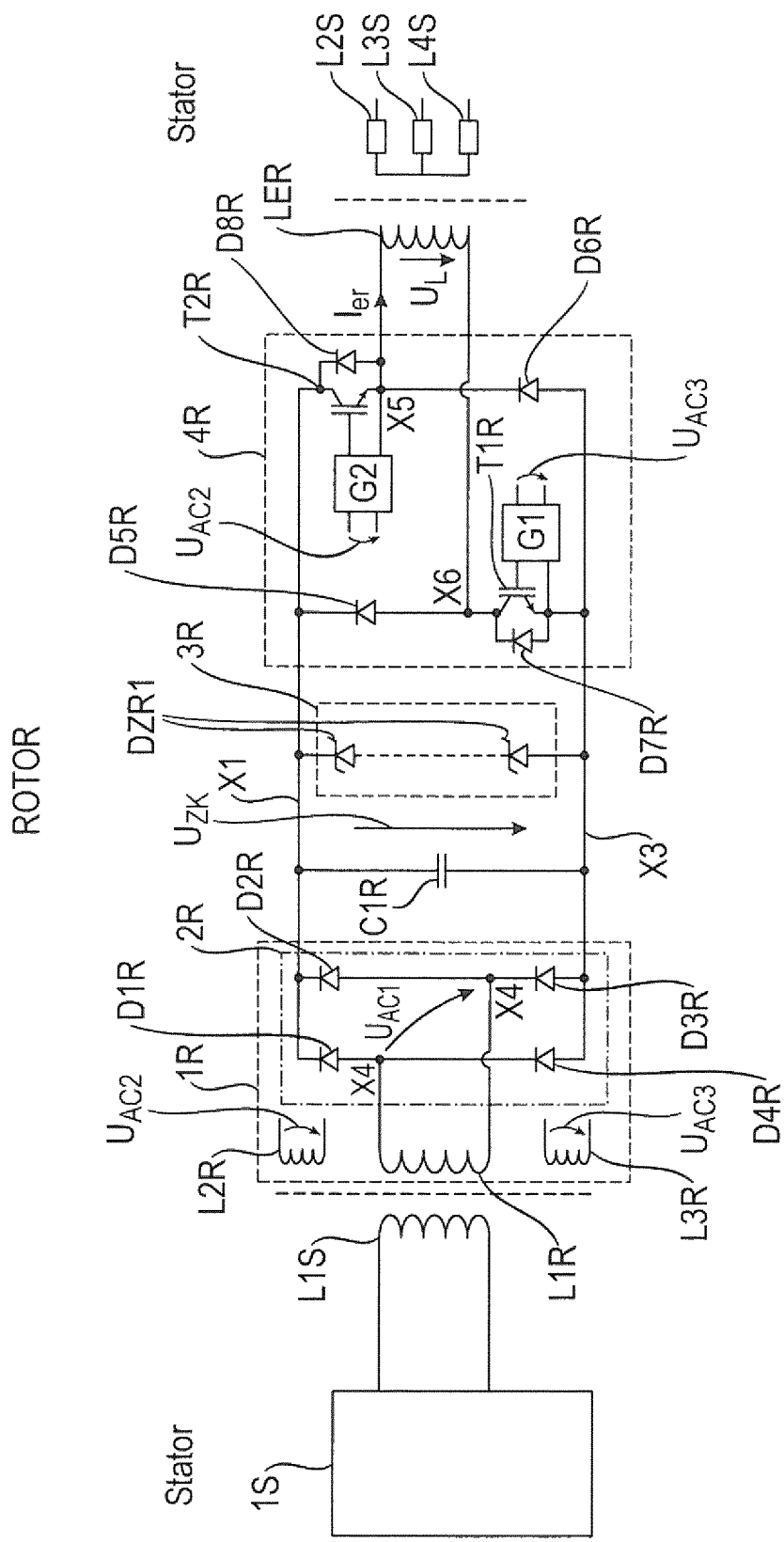
FIG. 1 shows a first embodiment of a rotor according to the invention and of a synchronous machine according to the invention and the corresponding electronic system, which performs a function both for fast demagnetization and for protecting a rectifier.

FIG. 1 shows a first embodiment of a rotor according to the invention and of a synchronous machine according to the invention and the corresponding electronic system. The synchronous machine is preferably installed in a motor vehicle and forms for example the unit for driving the motor vehicle or is part of a range extender.

The electronic system is provided in particular for the brushless excitation of an excitation coil LER arranged on the rotor.

The stator electronic system arranged at the stator comprises an inverter 1S, which converts/inverts a DC voltage supplied by a voltage source (not shown), for example a vehicle battery, which is preferably in a range of 250V to 450V, into an AC voltage.

A coil L1S that forms a primary side of a rotary transformer is connected to the inverter 1S.

A rotor electronic system comprising a supply circuit 1R with a coil L1R and a rectifier 2R is provided on the rotor of the synchronous machine, wherein the coil L1R forms the secondary side of the rotary transformer.

The rectifier 2R is preferably constructed from two series circuits each having two diodes D1R, D4R and D2R, D3R, thus a total of four diodes D1R to D4R, wherein the rotor-side coil L1R is connected to the rectifier 2R between the diodes D1R, D4R and D2R, D3R at the nodes X2, X4. The cathodes of the diodes D1R and D2R are connected to the node X1 or are at this potential. The anodes of the diodes D3R and D4R are connected to the node X3 or are at the corresponding potential. Optionally, the rectifier 2R may also have a smoothing capacitor C1R.

However, the rectifier 2R may also be realized by a rectifier of a different type.

Energy for the supply and excitation of the excitation coil LER can be fed contactlessly (in a brushless manner) to the supply circuit 1R. The energy is transmitted by induction in the circuit shown in FIG. 1. For this purpose, an AC voltage is present at the stator-side coil L1S—the primary side of the rotary transformer, wherein, by means of the AC current thus occurring, the coil L1S builds up a changing magnetic field which permeates the coil L1R arranged on the rotor—of the secondary side of the rotary transformer. The change of the magnetic field generated by the coil L1S leads to a change of the magnetic flux density of the magnetic flux permeating the cross-sectional area of the coil L1R, as a result of which an AC voltage $U_{AC1}$ is present/occurs at the coil L1R or at the nodes X2, X4 by means of induction.

Said AC voltage $U_{AC1}$ is rectified by the rectifier 2R, wherein the rectified voltage is dropped across the excitation coil LER in the form of the voltage $U_L$ shown and leads to a current flow $I_{er}$ through the excitation coil LER. In normal operation, i.e. during the operation of the rotary transformer or during the energy supply of the excitation coil LER performed by the supply circuit 1R, the transistors T1R, T2R that will be explained below are switched into their closed (conducting) states, collector-emitter junction conducting, and may be regarded as short circuits in an idealized way.

In the state of the excitation coil LER in which current flows through the latter, said excitation coil generates the magnetic field which interacts, during motor operation of the synchronous machine, with a rotary magnetic field generated by the stator coils L2S, L3S, L4S arranged around the rotor, in such a way that the rotor rotates and drives the motor vehicle. If the synchronous machine is used as part of a range extender and the rotor in generator operation is rotated/driven by an internal combustion engine, that leads to induction at the stator coils L2S, L3S, L4S and to the generation of an AC output voltage at the stator coils L2S, L3S, L4S. The AC output voltage is rectified and is present at a vehicle battery for changing the vehicle battery.

The demagnetization circuit of the rotor electronic system comprises a bridge-like circuit 4R formed from two series circuits, a series circuit 3R constructed from suppressor diodes DZR1, and driver circuits G1, G2.

The series circuit 3R is situated in a circuit branch in parallel with the rectifier 2R of the supply circuit 1R. The suppressor diodes DZR1 are present in the circuit branch in such a way that they block a current flow from the node X1 to the node X3 below a breakdown voltage arising from the series circuit 3R.

In normal operation of the electronic system provided on the rotor, substantially no current flows through the circuit branch connected in parallel with the excitation coil LER because the transistors T1R, T2R are in closed (conducting) states and the excitation coil LER has a very low resistance in comparison with the suppressor diodes DZR1.

The excitation coil LER is situated in the bridge branch i.e. at the nodes X5, X6 of the bridge-like circuit 4R.

A first series circuit of the bridge-like circuit 4R comprises a diode D5R and a transistor T1R, which is preferably an IGB transistor. The cathode of the diode D5R is at the potential of the node X1 and is connected by its anode to the collector of the transistor T1R. The emitter of the transistor T1R is at the potential of the node X3. A further diode D7R is connected in antiparallel between collector and emitter of the transistor T1R.

A second series circuit of the bridge-like circuit 4R likewise comprises a transistor T2R, which is preferably constructed from an identical IGB transistor, and a diode D6R preferably identical to the diode D5R. In the second series circuit, the collector of the transistor T2R is at the potential of the node X1 and is connected by its emitter to the cathode of the diode D6R. The anode of the diode D6R is at the potential of the node X3. As also in the case of the transistor T1R, a further diode D8R is connected in antiparallel between collector and emitter of the transistor T2R.

The excitation coil LER is situated in the bridge branch, i.e. respectively between the diode D5R, D6R and the corresponding transistor T1R, T2R.

The suppressor diodes DZR1 perform the following function for fast de-excitation or demagnetization of the excitation coil LER.

If the energy supply of the excitation coil LER by the supply circuit 1R collapses e.g. upon an emergency shutdown of the inverter 1S, it is desirable for the excitation coil LER to be de-excited or demagnetized as fast as possible. The collapse of the energy supply of the excitation coil LER by the supply circuit 1R is identified by the driver circuits G1 and G2, as will be explained in greater detail below. The driver circuits G1, G2 in this case drive the transistors T1R, T2R in such a way that the transistors T1R, T2R switch or are opened and the corresponding collector-emitter channels thus assume their non-conducting state.

Upon shutdown of the energy supply of the excitation coil LER, the excitation coil LER generates a voltage of opposite polarity, as is known, on account of its endeavor to maintain the current flow. Since the transistors T1R, T2R are in their open (non-conducting) states or are switched off, the excitation current $I_{er}$ flows via the diodes D5R D6R, for which reason the voltage generated by the excitation coil LER is inverted and is present at the series circuit 3R with the same polarity as the voltage $U_{zk}$, output by the rectifier 2R during the energy supply. The excitation coil LER generates a voltage having such a value that corresponds to the value of the breakdown voltage of the series circuit 3R. This voltage is accompanied by a large current change of the current $I_{er}$ flowing through the excitation coil LER, for which reason a fast demagnetization or de-excitation of the excitation coil LER occurs. In this respect, as a result of the switching of the transistors T1R, T2R, the excitation current is diverted into the voltage branch in which the suppressor diodes DZR1 are situated. The demagnetization of the excitation coil LER is significantly faster in comparison with the same rotor electronic system without a demagnetization circuit, in which the time constant with which the current through the excitation coil LER decays would be determined only by the very low forward resistances of the forward-biased diodes D1R to D4R and the ohmic resistance of the excitation coil LER.

Furthermore, the suppressor diodes DZR1 also form the following protection function.

In normal operation—during the operation of the rotary transformer or the energy supply of the excitation coil by the supply circuit 1R—the transistors T1R, T2R are in a closed state in which the collector-emitter junctions of the transistors are in their conducting states and may be regarded as short circuits in an idealized way. An excitation current $I_{er}$ flows through the excitation coil LER during normal operation, as a result of which said excitation coil builds up a magnetic field necessary for a rotation of the rotor.

If the stator coils L2S, L3S, L4S are driven during the operation of the synchronous machine in such a way that a great change in the rotary magnetic field occurs, at the excitation coil LER induction may give rise to such a high induced voltage that the rectifier 2R—without additional protective measures—would be damaged. The same may occur in the case of high electrical perturbation effects on the stator coils in generator operation. Such an induced voltage has an opposite polarity to the voltage generated upon demagnetization at the excitation coil.

If such an induced voltage appears, it is necessary to protect the rectifier 2R supplying the excitation coil LER against damage. For this purpose, the series circuit 3R connected in parallel with the excitation coil LER is likewise provided. If the value of an induced voltage generated at the excitation coil LER exceeds the value of a breakdown voltage arising from the series circuit 3R of the suppressor diodes DZR1, the suppressor diodes DZR1 break down and take up the corresponding current. The rectifier 2R is thereby consequently protected against damage caused by the induced voltage.

As becomes evident from the text above, the series circuit 3R serves both for protecting the supply circuit 1R and for the demagnetization or de-excitation of the excitation coil LER. In this respect, a demagnetization circuit can be provided which simultaneously performs a plurality of functions, without additional circuitry complexity arising.

As is shown in FIG. 1, the transistors T1R, T2R have the antiparallel diodes D7R, D8R. If the transistors T1R, T2R are in their open states during the demagnetization of the excitation coil LER, the series circuit 3R constructed from the suppressor diodes likewise protects the supply circuit 1R against an excessively high induced voltage, without the risk of the induced voltage damaging the bridge-like circuit 4R itself. This is because if an induced voltage occurs at the excitation coil LER during the demagnetization or de-excitation of the excitation coil LER the corresponding current can flow via the antiparallel diodes D7R, D8R in the direction of the suppressor diodes DZR1, without the risk of damage to the elements of the bridge-like circuit 4R.

In order to identify whether or not the energy supply of the excitation coil LER by the supply circuit 1R collapses, the driver circuits G1, G2 are connected to auxiliary coils L2R, L3R of the supply circuit 1R which belong to the secondary side of the rotary transformer. By means of these auxiliary coils L2R, L3R, as also in the case of the coil L1R, energy for supplying the driver circuits G1, G2 can be transmitted contactlessly (in a brushless manner) to the rotor.

Figure 2:
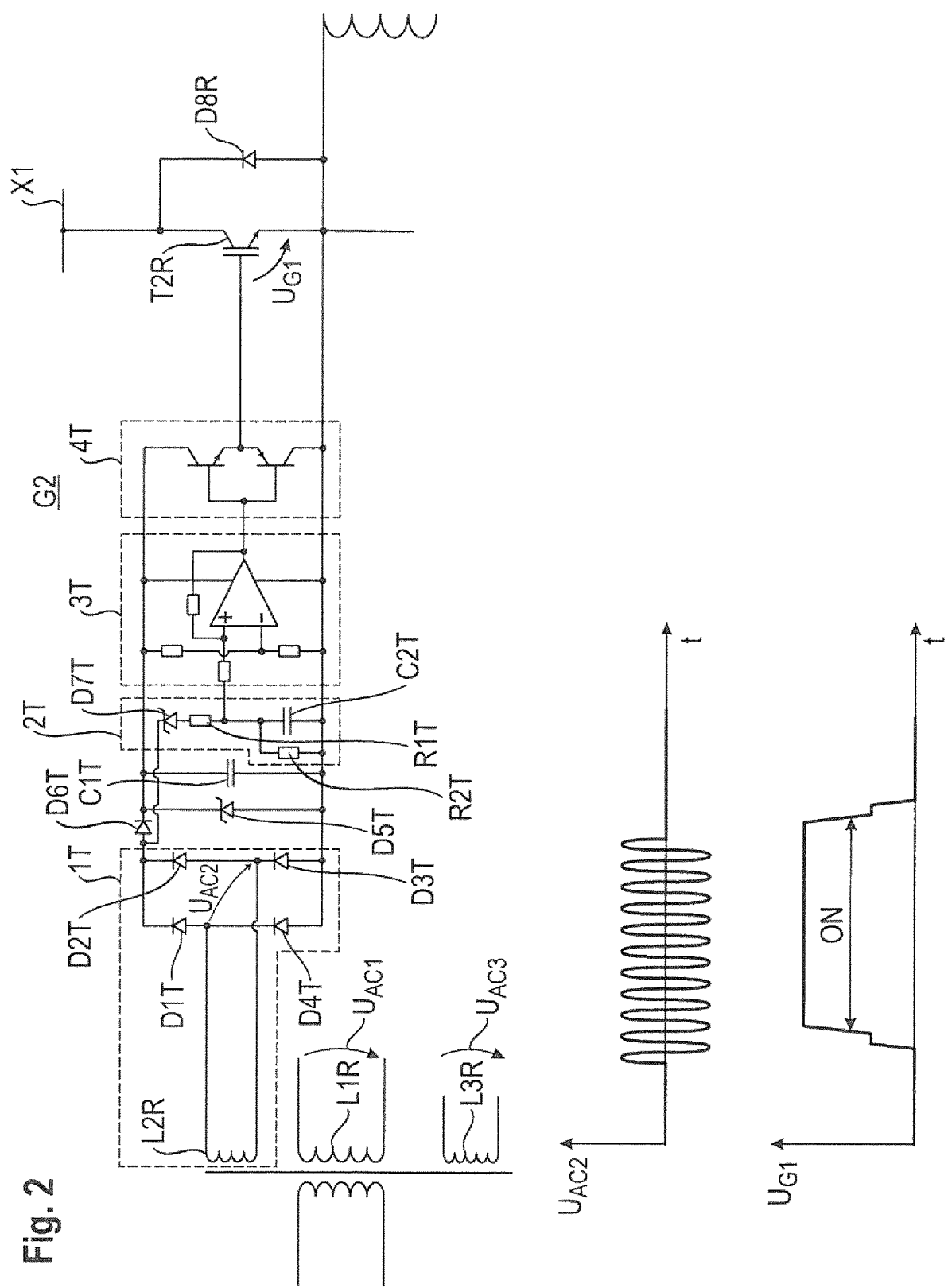
FIG. 2 shows the construction of a driver circuit for driving a switch of a demagnetization circuit and corresponding signal profiles of the driver circuit.

Referring to FIG. 2, the exact construction of the driver circuit G2 shown in FIG. 1 will now be explained. The driver circuit G1 is preferably constructed identically.

The driver circuit G2 comprises a driver supply circuit 1T, which is constructed from the auxiliary coil L2R and a rectifier. As already mentioned, energy can be fed to said driver supply circuit 1T inductively in such a way that the driver supply circuit 1T supplies the driver circuit with energy. The rectifier, like the rectifier 2R as well, is constructed from four diodes D1T-D4T, wherein the auxiliary coil L2R is connected between the diodes. The auxiliary coil L2R supplies an AC voltage $U_{AC2}$ that is rectified by the rectifier. The rectifier may also be constructed differently. As mentioned, the driver circuit G1 is constructed identically. The only difference is that the driver circuit G1 is connected to the auxiliary coil L3R and is supplied/driven by the corresponding AC voltage $U_{AC3}$.

In order to protect the driver circuit G2 against an excessively high voltage output by the rectifier, provision is made of a protective diode D5T in the form of a Zener diode, to which the voltage output by the rectifier is applied via a further diode D6T. If the voltage output by the rectifier exceeds the breakdown voltage of the Zener diode D5T the latter breaks down and protects the driver circuit G2 against damage.

A storage capacitor C1T is connected in parallel with the Zener diode D5T and stores so much energy that, after the collapse of the voltage supplied by the driver supply circuit 1T, the working of the driver circuit is maintained for a specific time.

Besides the circuit elements explained, the driver circuit G2 further comprises a comparator 3T in the form of a Schmitt trigger, the output of which is connected to a driver stage 4T in the form of a push-pull stage.

An input threshold 2T of the Schmitt trigger 3T is constructed by means of a diode D7T, a voltage divider formed from resistors R1T, R2T, and a further capacitor C2T. During normal operation, i.e. during the supply of the driver circuit G2 by the driver supply circuit 1T the DC voltage output by the rectifier is present at the input threshold 2T. In this case, the capacitor C1T and, after the breakdown of the Zener diode D7T, the capacitor C2T are charged, as a result of which the Schmitt trigger 3T drives the driver stage 4T in such a way that an output voltage $U_{G1}$ present at the gate terminal of the transistor T2R switches the transistor T2R into its closed (conducting) state.

FIG. 2 likewise shows the voltage profile of the AC voltage $U_{AC2}$ which is supplied by the auxiliary coil L2R and which is rectified by the rectifier, and the signal profile of the output voltage $U_{G1}$ of the driver circuit G2, said output voltage driving the switch T2R. The signal profiles are identical in the driver circuit G1.

The AC voltage $U_{AC1}$ supplied by the auxiliary coil L2R has a periodic profile having a preferred frequency in a range of 10 to 50 kHz and is present at the rectifier.

As can be gathered from the signal profiles from FIG. 2, the output voltage $U_{G1}$ present at the gate terminal of the transistor T2R and driving the transistor, as long as the energy supply of the driver circuit is maintained, has a value such that the transistor T2R is in its closed state (collector-emitter junction conducting).

If the energy supply of the driver circuit G2 collapses, the transistor T2R switches into its open state (collector-emitter junction non-conducting) after a short delay time of the order of magnitude of a few, in particular one to two, periods of the AC voltage $U_{AC2}$ supplied by the auxiliary coil L2R. The duration for this switching process is consequently in a range of 20 µs to 200 µs and is significantly shorter than the time constant for the demagnetization of the excitation coil LER via the rectifier. The switching process is explained in greater detail below.

The DC voltage output by the rectifier is applied to the storage capacitor C1T via the diode D6T and charges said storage capacitor during the energy supply of the driver circuit G2.

As is evident from FIG. 2, the DC voltage output by the rectifier forms not only the supply voltage of the driver circuit G2, but also the input signal of the input threshold 2T.

If the energy supply of the driver circuit G2 and thus the DC voltage supplied by the rectifier collapse, the input signal of the input threshold 2T changes directly as a consequence.

The diode D6T prevents the voltage supplied by the storage capacitor C1T from being present at the input threshold 2T.

The Schmitt trigger 3T is preferably a non-inverting Schmitt trigger, wherein the voltage dropped across the capacitor C2T is present at a non-inverting input of an operational amplifier associated with the Schmitt trigger 3T.

As long as the energy supply of the driver circuit G2 is maintained and the capacitor C2T is in a charged state, the operational amplifier outputs a corresponding output signal which is fed to the gate terminal of the transistor T2R via the push-pull driver stage 4T and drives the transistor T2R.

Upon collapse of the energy supply of the driver G2, the capacitor C2T discharges very rapidly, which leads to an extremely fast change of the output signal of the operational amplifier and to the driving or switching of the transistor T2R. The storage capacitor C1T maintains the energy supply of the driver G2 until the transistor T2R has switched. Through suitable selection of the resistors R1T, R2T and of the capacitor C2T, the input threshold 2T is dimensioned such that the time constant for discharging the capacitor C2T is of the order of magnitude of a few, in particular one to two, periods (20 µs to 200 µs) of the AC voltage $U_{AC2}$ supplied by the auxiliary coil L2R and is simultaneously less than a time constant for discharging the storage capacitor C1T.

As already mentioned, both driver circuits G1, G2 are identical, wherein the driver circuit G1 is driven or fed by the auxiliary coil L3R supplying the AC voltage $U_{AC3}$.

Referring to FIGS. 3A-3D, various signal profiles are also explained below.

FIG. 3A shows the signal profile of the AC voltage $U_{AC1}$ supplied by the coil L1R. The AC voltage shown in FIG. 3A collapses at the point in time t1.

As is evident from FIG. 3B, the rectifier 2R outputs until the point in time t1 a DC voltage which corresponds to the AC voltage $U_{AC1}$ and which has a certain ripple alleviated by the smoothing capacitor C1R.

FIG. 3C shows the drive voltages of the transistors T1R, T2R; and FIG. 3D shows the current $I_{er}$ flowing through the excitation coil.

If the energy supply of the rotor electronic system collapses at the point in time t1, this is identified by the auxiliary coils L2R, L3R and the corresponding driver circuits G1, G2. As has already been explained with reference to FIG. 2, the time for identifying the collapse of the energy supply is only a few periods of the AC voltage $U_{AC1}$ and $U_{AC2}$, $U_{AC3}$. This also becomes evident from FIG. 3C, according to which the voltages $U_{G1}$, $U_{G2}$ driving the transistors have fallen to zero volts after this time has elapsed.

As explained with reference to FIG. 1, the voltage generated and jumping at the excitation coil LER is present, after the switching of the transistors T1R, T2R, at the series circuit 3R formed from the suppressor diodes DZR1. On account of the endeavor by the excitation coil LER to maintain the excitation current, the voltage generated by the excitation coil LER increases until it reaches a value of the breakdown voltage of the series circuit 3R. This becomes evident from the signal profile from FIG. 3B between the points in time t2 and t3. This voltage increase is accompanied by a fast current change of the current $I_{er}$ flowing through the excitation coil LER, which is in turn evident from FIG. 3D. The high current change of the excitation current $I_{er}$ is tantamount to a fast de-excitation or demagnetization of the excitation coil LER.

Second Embodiment

Figure 4:
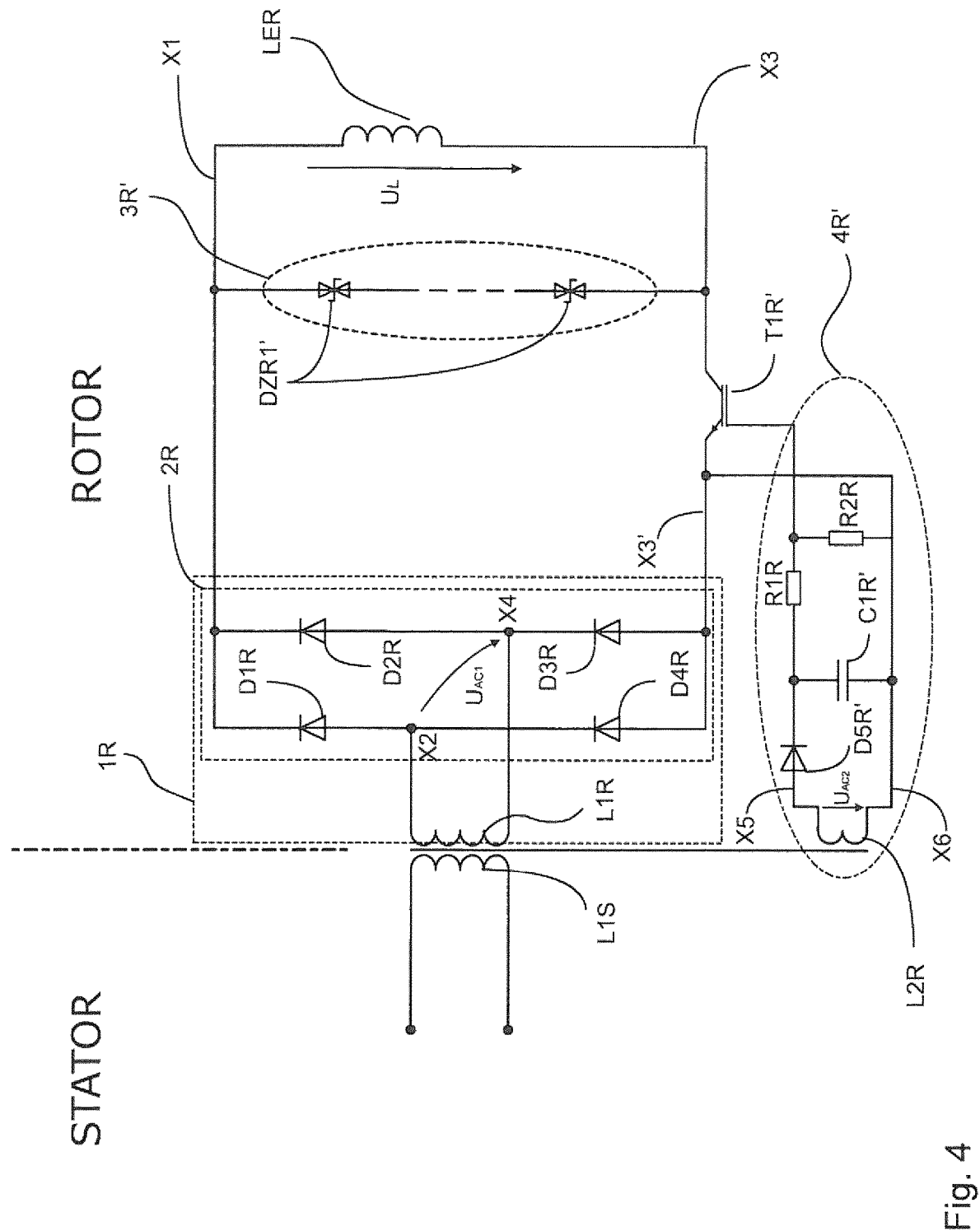
FIG. 4 schematically shows a second preferred embodiment of a rotor according to the invention and of a synchronous machine according to the invention and the corresponding electronic system, which performs a function both for fast demagnetization and for protecting a rectifier.

FIG. 4 schematically shows a second embodiment of a rotor according to the invention and of a synchronous machine according to the invention and a corresponding electronic system.

Elements that are identical to those of the first preferred embodiment have identical reference signs and will not be explained again.

The AC voltage $U_{AC1}$ shown in FIG. 4 is rectified by the rectifier 2R, wherein the rectified voltage is dropped across the excitation coil LER in the form of the voltage $U_L$ shown and leads to a current flow through the excitation coil LER.

In normal operation, i.e. during the operation of the rotary transformer or during the energy supply of the excitation coil LER performed by the supply circuit 1R, the transistor T1R' also explained below is switched into its closed state (collector-emitter junction conducting) and may be regarded as a short circuit in an idealized way.

In the state of the excitation coil LER in which current flows through the latter, said excitation coil generates the magnetic field which interacts, during motor operation of the synchronous machine, with a rotary magnetic field generated by the stator coils L2S, L3S, L4S (not shown in FIG. 4) arranged around the rotor, in such a way that the rotor rotates and drives the motor vehicle. If the synchronous machine is used as part of a range extender and the rotor in generator operation is rotated/driven by an internal combustion engine, that leads to induction at the stator coils and to the generation of an AC output voltage at the stator coils. The AC output voltage is rectified and is present at a vehicle battery for charging the vehicle battery.

The circuit arranged on the rotor comprises a demagnetization circuit, which provides for a fast demagnetization of the excitation coil LER for example upon an emergency shutdown. The demagnetization circuit comprises a multiplicity of bidirectional suppressor diodes 3R' arranged in a circuit branch connected in parallel with the excitation coil LER, the transistor T1R' and a driver circuit 4R'.

The transistor T1R', which is preferably an IGB transistor or alternatively may also be a field effect transistor or bipolar transistor is driven by the driver circuit 4R', wherein the driver circuit 4R' for this purpose comprises the auxiliary coil L2R, a rectifier and a voltage divider.

Like the coil L1R, the auxiliary coil L2R also generates an AC voltage by induction, said AC voltage being converted/rectified by the rectifier. The auxiliary coil L2R is connected to the nodes X5, X6. In this case, the rectifier is a simple half-wave rectifier comprising a diode D5R' and a smoothing capacitor C1R'. The rectified voltage is applied to the corresponding gate terminal via the voltage divider for driving the transistor T1R', said voltage divider being formed from resistors R1R, R2R. The applied DC voltage switches the transistor T1R' into its closed state in which the collector-emitter junction is conducting. The driver circuit 4R' is only preferably constructed in this way and may also be configured differently as required. By way of example, the auxiliary coil L2R may be omitted and the AC voltage may be concomitantly tapped off at the coil L1R. Furthermore, the drive signal of the transistor T1R' could be transmitted optically between stator and rotor.

The demagnetization circuit furthermore also comprises the abovementioned series-connected bidirectional suppressor diodes DZR1' arranged in the circuit branch connected in parallel with the excitation coil LER. The bidirectional suppressor diodes DZR1' block in both directions as long as a voltage dropped across the suppressor diodes DZR1' does not correspond to a specific breakdown voltage.

Only the blocking effect of the bidirectional suppressor diodes DZR1' with respect to a current flow from the node X3 to the node X1 is of importance for the demagnetization.

In normal operation of the electronic system provided on the rotor, substantially no current flows through the circuit branch connected in parallel with the excitation coil LER because the transistor T1R' is in its closed (conducting) state and the excitation coil LER has a very low resistance in comparison with the suppressor diodes DZR1'.

As is evident from FIG. 4 and is explained below, the current $I_{er}$ flowing through the excitation coil LER can be diverted, by means of the switching of the transistor T1R', into the circuit branch connected in parallel with the excitation coil LER.

If, in the event of an accident, for example, the voltage supply by the vehicle battery is interrupted, for example as a result of the separation of one of its terminals, the AC voltage $U_{AC1}$ at the auxiliary coil L2R and thus the DC voltage at the transistor T1R' collapse. As a result, the transistor T1R' undergoes transition to the open (non-conducting) state, that is to say that the collector-emitter junction of the transistor T1R' is turned off.

As a result of the switching of the transistor T1R' the current flow through the excitation coil LER is interrupted, for which reason the voltage at the excitation coil LER, on account of the endeavor by the excitation coil LER to maintain the current flow, reverses and abruptly increases. On account of the blocking effect of the bidirectional suppressor diodes DZR1' and the initial high resistance associated therewith, the voltage at the excitation coil LER increases abruptly up to such a value which corresponds to the value of the breakdown voltage arising from the series circuit comprising the suppressor diodes DZR1' and at which a breakdown of the suppressor diodes DZR1' occurs. Equally, the absolute value of the change of the current $I_{er}$ flowing through the excitation coil LER increases with the rise in the voltage generated by the excitation coil LER. To put it another way the time constant with which the current through the excitation coil decays is very small by virtue of the suppressor diodes DZR1'. The consequence is a faster demagnetization of the excitation coil LER in comparison with the same circuit without a demagnetization circuit in which the time constant with which the current through the excitation coil LER decays is determined by the very low forward resistances of the forward-biased diodes D1R to D4R and the ohmic resistance of the excitation coil LER.

Besides the function explained for the demagnetization, the suppressor diodes DZR1' also perform a protection function—explained below—for protecting the supply circuit 1R or the rectifier 2R against an excessively high induced voltage generated at the excitation coil LER. The bidirectional suppressor diodes DZR1', as explained, are also reverse-biased with respect to the DC voltage generated by the rectifier 2R, such that no current flow through the suppressor diodes DZR1' occurs upon proper generation of the DC voltage by the rectifier 2R.

If the stator coils (not shown in FIG. 4) are driven during the operation of the synchronous machine in such a way that a great change in the rotary magnetic field occurs, at the excitation coil LER induction may give rise to such a high induced voltage that the rectifier 2R—without additional protective measures—would be damaged. The same may occur in the case of high electrical perturbation effects on the stator coils in generator operation. Such an induced voltage has an opposite polarity to the voltage generated upon demagnetization at the excitation coil.

In order to prevent damage to the rectifier 2R provision is made of the bidirectional suppressor diodes DZR1 with their blocking effect with respect to a current from the node X1 to node X3. If the induced voltage generated at the excitation coil LER assumes such a value corresponding to the value of the breakdown voltage arising from the series circuit comprising the suppressor diodes DZR1', the suppressor diodes DZR1' break down and take up the current generated by the excitation coil or flowing through the excitation coil.

The rectifier is thus relieved in terms of loading and is protected against damage. The energy taken up by the suppressor diodes DZR1' is converted into heat and emitted to the surroundings. If the induced voltage generated at the excitation coil LER decreases when the change in the rotary magnetic field subsides, the suppressor diodes DZR1' are turned off again and the entire rotor circuit reverts to its normal operation.

In both preferred embodiments, in the circuit branch connected in parallel with the excitation coil LER preferably a series circuit comprising unidirectional or bidirectional suppressor diodes DZR1 is provided, although series circuits comprising uni/bidirectional Zener diodes or uni/bidirectional varistors, for example, may also be used.

Very preferably, the (bi)directional components, i.e. suppressor diodes, Zener diodes or varistors, are combined in an array of a multiplicity of parallel series circuits each having n components to form an assembly.

As can be understood from the explanations above, besides the function for faster demagnetization, a protection function can be realized as well, without the circuitry complexity increasing.

In comparison with a rotor electronic system in which the demagnetization circuit and a protective circuit for protecting the supply circuit against an induced voltage would be realized separately from one another, a considerable space saving and a considerable reduction of the fitting complexity or of the number of components required are achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for a synchronous machine of a motor vehicle, wherein the rotor comprises:
    an excitation coil configured to generate a magnetic field necessary for rotation of the rotor in a stator of the synchronous machine;
    a supply circuit, to which energy is fed contactlessly such that the supply circuit supplies the excitation coil with the energy; and
    a demagnetization circuit configured to demagnetize the excitation coil, which, upon collapse of the energy supply of the excitation coil, diverts a current flowing through the excitation coil into a circuit branch in which at least one component for demagnetization is arranged, wherein the at least one component is also configured to perform a protection function to protect the supply circuit against an induced voltage generated at the excitation coil;
    the at least one component performs the protection function to protect the supply circuit against the induced voltage generated at the excitation coil during a supply of energy to the excitation coil by the supply circuit and also upon or after a collapse of the supply of energy to the excitation coil by the supply circuit; the at least one component is a component which reduces its resistance starting from a value of the induced voltage;
    the demagnetization circuit is configured, upon collapse of the supply of energy to the excitation coil by the supply circuit, to invert the voltage generated by the excitation coil and to apply said voltage to the circuit branch such that the current generated by the excitation coil flows through the component;
    the demagnetization circuit comprises a bridge-like circuit constructed from two series circuits and the excitation coil is situated in a bridge branch of the bridge-like circuit, wherein the two series circuits are formed in each case from a switch connected in series with a diode; and
    the demagnetization circuit is configured such that, upon collapse of the supply of energy to the excitation coil by the supply circuit, the switches are switched and the diodes invert the voltage generated by the excitation coil.

2. The rotor as claimed in claim 1, wherein the demagnetization circuit is configured such that the switches are closed during the supply of energy to the excitation coil by the supply circuit and are opened upon collapse of said supply of energy.

3. The rotor as claimed in claim 1,
    wherein the demagnetization circuit comprises at least one driver circuit that drives the switches; wherein
    the driver circuit comprises a driver supply circuit, to which energy is fed such that the driver supply circuit supplies a comparator with energy, and
    the comparator outputs an output signal for driving the switches depending on whether the driver supply circuit supplies the comparator with energy or supply of energy by the driver supply circuit has collapsed.

4. The rotor as claimed in claim 2,
    wherein the demagnetization circuit comprises at least one driver circuit that drives the switches; wherein
    the driver circuit comprises a driver supply circuit, to which energy is fed such that the driver supply circuit supplies a comparator with energy, and
    the comparator outputs an output signal for driving the switches depending on whether the driver supply circuit supplies the comparator with energy or supply of energy by the driver supply circuit has collapsed.

5. The rotor as claimed in claim 3, wherein the driver circuit is configured such that the driver supply circuit charges a storage unit which, upon collapse of the supply of energy to the comparator by the driver supply circuit, maintains the supply of energy to the comparator until the comparator has output the output signal for driving the switches.

6. The rotor as claimed in claim 4, wherein the driver circuit is configured such that the driver supply circuit charges a storage unit which, upon collapse of the supply of energy to the comparator by the driver supply circuit, maintains the supply of energy to the comparator until the comparator has output the output signal for driving the switches.

7. The rotor as claimed in claim 3, wherein the comparator is a Schmitt trigger, and the storage unit comprises a capacitor and an input threshold of the Schmitt trigger also comprises a capacitor, wherein the driver circuit is configured such that a time constant for discharging the capacitor of the input threshold is less than a time constant for discharging the capacitor of the storage unit.

8. The rotor as claimed in claim 5, wherein the comparator is a Schmitt trigger, and the storage unit comprises a capacitor and an input threshold of the Schmitt trigger also comprises a capacitor, wherein the driver circuit is configured such that a time constant for discharging the capacitor of the input threshold is less than a time constant for discharging the capacitor of the storage unit.

9. The rotor as claimed in claim 7, wherein the at least one component is formed from a multiplicity of series circuits comprising at least one of Zener diodes, suppressor diodes and varistors, and the series circuits are connected in parallel with one another.

10. A rotor for a synchronous machine of a motor vehicle, wherein the rotor comprises:
    an excitation coil configured to generate a magnetic field necessary for rotation of the rotor in a stator of the synchronous machine;
    a supply circuit, to which energy is fed contactlessly such that the supply circuit supplies the excitation coil with the energy; and
    a demagnetization circuit configured to demagnetize the excitation coil, which, upon collapse of the energy supply of the excitation coil, diverts a current flowing through the excitation coil into a circuit branch in which at least one component for demagnetization is arranged, wherein the at least one component is also configured to perform a protection function to protect the supply circuit against an induced voltage generated at the excitation coil;

the at least one component performs the protection function to protect the supply circuit against the induced voltage generated at the excitation coil during a supply of energy to the excitation coil by the supply circuit and also upon or after a collapse of the supply of energy to the excitation coil by the supply circuit;

the circuit branch is connected in parallel with the excitation coil and the at least one component is a bidirectional component which reduces its resistance upon collapse of the supply of energy to the excitation coil by the supply circuit starting from a value of a voltage generated by the excitation coil and starting from a value of an induced voltage generated at the excitation coil with opposite polarity;

the at least one component is a bidirectional suppressor diode, a bidirectional varistor, or a bidirectional Zener diode; and in the circuit branch a multiplicity of series circuits comprising a plurality of bidirectional components are arranged and the series circuits are connected in parallel with one another.

11. A synchronous machine for a motor vehicle, wherein the synchronous machine includes a rotor, the rotor comprising:

an excitation coil configured to generate a magnetic field necessary for rotation of the rotor in a stator of the synchronous machine;

a supply circuit, to which energy is fed contactlessly such that the supply circuit supplies the excitation coil with the energy; and a demagnetization circuit configured to demagnetize the excitation coil, which, upon collapse of the energy supply of the excitation coil, diverts a current flowing through the excitation coil into a circuit branch in which at least one component for demagnetization is arranged, wherein the at least one component is also configured to perform a protection function to protect the supply circuit against an induced voltage generated at the excitation coil;

the at least one component performs the protection function to protect the supply circuit against the induced voltage generated at the excitation coil during a supply of energy to the excitation coil by the supply circuit and also upon or after a collapse of the supply of energy to the excitation coil by the supply circuit;

the at least one component is a component which reduces its resistance starting from a value of the induced voltage;

the demagnetization circuit is configured, upon collapse of the supply of energy to the excitation coil by the supply circuit, to invert the voltage generated by the excitation coil and to apply said voltage to the circuit branch such that the current generated by the excitation coil flows through the component;

the demagnetization circuit comprises a bridge-like circuit constructed from two series circuits and the excitation coil is situated in a bridge branch of the bridge-like circuit, wherein the two series circuits are formed in each case from a switch connected in series with a diode; and the demagnetization circuit is configured such that, upon collapse of the supply of energy to the excitation coil by the supply circuit, the switches are switched and the diodes invert the voltage generated by the excitation coil.

12. A synchronous machine for a motor vehicle, wherein the synchronous machine includes a rotor, the rotor comprising:

an excitation coil configured to generate a magnetic field necessary for rotation of the rotor in a stator of the synchronous machine;

a supply circuit, to which energy is fed contactlessly such that the supply circuit supplies the excitation coil with the energy; and a demagnetization circuit configured to demagnetize the excitation coil, which, upon collapse of the energy supply of the excitation coil, diverts a current flowing through the excitation coil into a circuit branch in which at least one component for demagnetization is arranged, wherein the at least one component is also configured to perform a protection function to protect the supply circuit against an induced voltage generated at the excitation coil;

the at least one component performs the protection function to protect the supply circuit against the induced voltage generated at the excitation coil during a supply of energy to the excitation coil by the supply circuit and also upon or after a collapse of the supply of energy to the excitation coil by the supply circuit;

the circuit branch is connected in parallel with the excitation coil and the at least one component is a bidirectional component which reduces its resistance upon collapse of the supply of energy to the excitation coil by the supply circuit starting from a value of a voltage generated by the excitation coil and starting from a value of an induced voltage generated at the excitation coil with opposite polarity;

the at least one component is a bidirectional suppressor diode, a bidirectional varistor, or a bidirectional Zener diode; and in the circuit branch a multiplicity of series circuits comprising a plurality of bidirectional components are arranged and the series circuits are connected in parallel with one another.

* * * * *